United States Patent
Manus

(10) Patent No.: US 8,807,254 B2
(45) Date of Patent: Aug. 19, 2014

(54) WHEEL WITH AN ELECTRICAL UNIT

(75) Inventor: George Manus, Turre (ES)

(73) Assignee: Nordict A/S, Soborg (DK)

( * ) Notice: Subject to any disclaimer, the term of this patent is extended or adjusted under 35 U.S.C. 154(b) by 0 days.

(21) Appl. No.: 13/701,733

(22) PCT Filed: Jun. 3, 2011

(86) PCT No.: PCT/EP2011/059189
§ 371 (c)(1),
(2), (4) Date: Dec. 3, 2012

(87) PCT Pub. No.: WO2011/151439
PCT Pub. Date: Dec. 8, 2011

(65) Prior Publication Data
US 2013/0069420 A1    Mar. 21, 2013

Related U.S. Application Data

(60) Provisional application No. 61/351,153, filed on Jun. 3, 2010.

(30) Foreign Application Priority Data

Jun. 3, 2010   (DK) .......................... PA 2010 70242

(51) Int. Cl.
*B60K 7/00*       (2006.01)
*B60K 17/04*      (2006.01)
(52) U.S. Cl.
CPC ....... *B60K 7/0007* (2013.01); *B60K 2007/0084* (2013.01); *B60K 17/043* (2013.01); *B60L 2220/44* (2013.01)
USPC .......................... 180/65.51; 180/65.6; 301/6.5

(58) Field of Classification Search
CPC ... B60L 2220/44; B60L 2220/46; B60K 7/00; B60K 7/0007; B60K 17/043; B60K 2007/00; B60K 2007/0038; B60K 2007/0061; B60K 2007/0069; B60K 2007/0084
USPC ................................ 180/65.51, 65.6; 301/6.5
See application file for complete search history.

(56) References Cited

U.S. PATENT DOCUMENTS 3,955,639 A  *  5/1976  Cragg ............................ 180/6.5
5,186,269 A  *  2/1993  Avakian et al. ................ 180/6.5

(Continued)

FOREIGN PATENT DOCUMENTS

AU       3992568 (A)       1/1971
DE       4115649 (A1)      9/1992

(Continued)

*Primary Examiner* — John Walters
*Assistant Examiner* — Brian Swenson
(74) *Attorney, Agent, or Firm* — Muncy, Geissler, Olds & Lowe, P.C.

(57) ABSTRACT

The invention provides an electrical wheel comprising a hub located along a center line, a rim being rotatable about the hub such that the center line forms axis of revolution, and an electrical unit arranged to provide torque between the hub and the rim. The rim forms a compartment with a sidewall extending between a circular bottom and an opening. The hub extends through a suspension located centrally in the circular bottom and terminates in a free end inside the compartment. The electrical unit is located in the compartment in continuation of the hub and fixed to the free end of the hub. The wheel comprises a transmission for transferring the torque from the electrical unit to the rim. The transmission is arranged in the compartment about the hub, and the transmission is located between the bottom and the electrical unit.

14 Claims, 7 Drawing Sheets

(56) References Cited

U.S. PATENT DOCUMENTS

| | | |
|---|---|---|
| 5,199,520 A | 4/1993 | Chen |
| 5,477,935 A * | 12/1995 | Chen .................. 180/65.51 |
| 5,558,174 A | 9/1996 | Avitan et al. |
| 5,562,174 A * | 10/1996 | Chen .................. 180/65.51 |
| 5,669,619 A | 9/1997 | Kim |
| 6,355,996 B1 * | 3/2002 | Birkestrand .................. 310/54 |
| 7,270,204 B2 * | 9/2007 | Taniguchi et al. ......... 180/65.51 |
| 7,392,872 B2 * | 7/2008 | Chiu et al. ............ 180/65.51 |
| 7,533,747 B2 * | 5/2009 | Heinen ............... 180/65.51 |
| 7,938,210 B2 * | 5/2011 | Kunzler et al. ........... 180/65.51 |
| 8,096,378 B2 * | 1/2012 | Xie ................ 180/65.51 |
| 8,439,140 B1 * | 5/2013 | Amortegui et al. ........ 180/65.51 |
| 8,459,386 B2 * | 6/2013 | Pickholz .................. 180/65.51 |
| 2012/0111648 A1 * | 5/2012 | Terashima et al. ............. 180/6.2 |

FOREIGN PATENT DOCUMENTS

| | | |
|---|---|---|
| DE | 298 03 665 U1 | 5/1998 |
| DE | 19962992 (A1) | 7/2001 |
| DE | 10008451 (A1) | 8/2001 |
| EP | 1350652 (A2) | 10/2003 |
| EP | 1 481 887 A1 | 12/2004 |
| EP | 1 671 832 A2 | 6/2006 |
| GB | 2269145 (A) | 2/1994 |
| WO | WO-03065963 (A1) | 8/2003 |

* cited by examiner

WHEEL WITH AN ELECTRICAL UNIT

FIELD OF THE INVENTION

The present invention relates to an electrical multi-purpose driving wheel. The wheel is suitable for mounting to a wide variety of mobile appliances, such as various carts, golf trolleys, bicycles, wheelchairs, small vehicles, wheelbarrows, etc.

BACKGROUND OF THE INVENTION

Various wheels and driving systems therefore have been proposed in the prior art. One such wheel and driving system is disclosed in EP-A-1 350 652, which discloses a motorised driving wheel comprising a circumferential rim defining an axis of revolution. The wheel system further comprises an electrical motor for producing a driving force, the motor comprising an output shaft rotatable around a motor axis. A transmission system is provided for transmitting the driving force from the motor to the circumferential rim. More specifically, the output shaft of the motor is provided with a gearwheel engaging a toothed inner circumferential portion of the wheel, so as to apply the driving force of the motor to the rim for advancing the wheel, the motor axis being substantially parallel to the axis of revolution of the rim. The wheel forms a housing enclosing the motor and a plurality of batteries, which provide electrical power to the motor.

It has been found that such a wheel system suffers from the drawback that the longitudinal dimension of the motor is limited by the width of the wheel, thereby putting an upper limit to the power producable by the motor.

SUMMARY OF THE INVENTION

It is an object of preferred embodiments of the present invention to provide an improved driving wheel.

Thus, in a first aspect, the present invention provides an electrical wheel comprising a hub extending along a centre line, a rim being rotatable about the hub such that the centre line forms axis of revolution, and an electrical unit arranged to provide a torque between the hub and the rim, where the rim forms a compartment with a sidewall extending between a circular bottom and an opening;

the hub extends through a suspension located centrally in the circular bottom and terminates in a free end inside the compartment;

the electrical unit is located in the compartment in continuation of the hub and fixed to the free end of the hub; and where the wheel comprises a transmission for transferring the torque from the electrical unit to the rim, the transmission is arranged in the compartment about the hub, and the transmission is located between the bottom and the electrical unit.

The hub is located along the centre line of the electrical wheel. In use, the wheel may cause movement of an object e.g. various carts, golf trolleys, bicycles, wheelchairs, small vehicles, wheelbarrows, etc. by rotation of the rim relative to the hub.

The rim forms a compartment with a sidewall extending between a circular bottom and an opening, thereby spanning a cylinder. It should be understood, that the bottom need not to be closed, but can be provided with one or more openings. As an example, the bottom may be provided as an open bottom with spokes. The sidewall of the rim may form the circumferential outer surface of the wheel. However, the wheel may further comprise a tyre being mounted around the outer surface of the rim.

A suspension is provided centrally in the circular bottom. The hub extends through the suspension and terminates in a free end inside the compartment.

The suspension may in a simple embodiment be in the form of an opening centrally in the bottom, through which opening the hub extends.

The electrical unit may e.g. be a motor, a generator, or a combination of both.

The electrical unit is capable of providing torque between the hub and the rim, and it may thereby be capable of rotating the rim to provide rotation of the wheel, i.e. acting as a motor. It should however be understood that the provided torque may be positive or negative, so that a positive torque occurs when the electrical unit is responsible for driving of the rim, whereas a negative torque may occur when the rim is responsible for driving of the electrical unit, i.e, the electrical unit is acting as a generator.

The electrical unit is located in the compartment in continuation of the hub. Furthermore, the electrical unit is fixed to the free end of the hub. As the electrical unit is fixed to the hub, the electrical unit does not rotate with the wheel. Instead the electrical unit is kept at a fixed position relative to the hub during rotation of the wheel.

A transmission is provided for transferring torque from the electrical unit to the rim. The transmission is arranged in the compartment about the hub, and the transmission is located between the bottom and the electrical unit.

By locating the transmission in the compartment between the bottom and the electrical unit, the transmission may be protected against interference from external elements.

Due to the specific location of the transmission in the compartment and in particular due to the location of the transmission between the bottom and the electrical unit, the transmission becomes shielded effectively by the compartment and by the electrical unit. In addition, service of the electrical unit and even replacement of the electrical unit is facilitated by the location of the electrical unit on that side of the transmission facing away from the bottom. As a further advantage, noise which can be created in the transmission can be dampened by the rim, the bottom, and the electrical unit.

In one embodiment, the electrical unit is configured as a motor which can move the rim relative to the hub. In this embodiment, the electrical unit is capable of providing torque between the hub and rim, and thereby capable of rotating the rim to provide rotation of the wheel.

In another embodiment, the electrical unit is configured as a generator which can generate electric energy upon movement of the rim relative to the hub. I.e. the electrical torque provided between the hub and the rim is negative, as the electrical unit is driven by the rim.

In yet another embodiment, the electrical unit is configured both as a motor and a generator. In this embodiment, positive torque occurs when the electrical unit drives the rim, whereas negative torque occurs when the electrical unit is driven by the rim. The wheel may comprise a switch which enables the user of the wheel to switch between negative and positive torque. The switch may be located at a mobile appliance incorporating the motorised wheel. An advantage of this embodiment is that the electrical unit may drive the wheel(s) of a mobile appliance, e.g. when the mobile appliance is to be moved up a hill thereby facilitating driving of the appliance. However, when the mobile appliance is to be moved down again, the electrical unit may be driven by the rim, whereby a battery may be charged. The electricity charged to the battery may be used at a later stage. However, instead of charging a battery and storing the electricity for later use, the electricity may be used when provided, e.g. by lamps or lights on a mobile appliance incorporating the wheel.

A control system may be associated with the switch. It may thereby be possible to switch between negative and positive torque, e.g. based on speed. As an example, the control system may be responsible for braking the wheel when the rotational speed of the wheel exceeds a pre-defined limit.

The rim may comprise a number of radially inwards projections which may strengthen the rim and further dampen noise from the transmission and the electrical unit in the compartment, as well as dampen vibrations. In particularly these projections may be constituted by a plurality of fins, e.g. extending along the sidewall, e.g. in the direction of the centre line or e.g. helically coiled around the centre line.

The transmission may comprise a first and a second drive wheel and a belt, the first drive wheel being driven by the electrical unit and the second drive wheel being driven by the first drive wheel via the belt. The drive wheels may be provided with a toothed outer surface and the belt may be provided with a toothed inner surface allowing for engagement between the teeth for transmission of a driving force from the electrical unit to the first drive wheel and further to the second drive wheel. As an alternative hereto, the driving force may be transmitted via frictional engagement, e.g. by providing the driving wheels and the belt by use of rubber or a similar material allowing for sufficient friction to ensure transmission of the driving force.

In an alternative embodiment, the transmission may comprise a number of gear wheels for transmission of a driving force from the electrical unit to the rim.

To ensure that the electrical unit can provide torque between the hub and the rim, the rim may comprise a seat for carrying the second drive wheel. The seat may form part of the rim or may alternatively be a separate element which can be attached to the rim.

In one embodiment, the seat may be positioned centrally in relation to the suspension so that the centre of both the seat and the suspension is located at the centre line. The hub may thereby extend through both the seat and the suspension. One way of achieving this is to position the seat around the suspension, e.g. by providing the seat with a central opening with a diameter being equal to or larger than the outer diameter of the suspension.

Torque may be transferred from the hub to the rim by ensuring engagement between the second drive wheel and the seat so that rotation of the second drive wheel results in rotation of the seat. As the seat may form part of the rim or may be attached to the rim rotation of the second drive wheel may thus ensure rotation of the rim.

Engagement between the seat and the second drive wheel may be ensured e.g. by providing one or more protrusions on the outer perimeter of the seat which protrusions may engage one or more indentations in the inner perimeter of the second drive wheel. The indention(s) and protrusion(s) may however also be reversely positioned. Engagement may alternatively or additionally be ensured by frictional engagement between the seat and the second drive wheel. Other types of engagement systems may also be used.

The first and second drive wheels may be made from a synthetic material e.g. plastic, from metal or from any other suitable material. In some embodiments, the weight of the transmission and thus the drive wheels are highly important, hence drive wheels of plastic or aluminium may be preferred. The seat and the rim may likewise be made from a synthetic material e.g. plastic, from metal or from another suitable material.

The electrical unit may comprise an output shaft rotatably around a rotor axis, the rotor axis being non-parallel with the hub, and thereby the centre line and thus the axis of revolution. Due to the fact that the rotor axis and hence the electrical unit itself may extend non-parallel to the hub, the longitudinal extent of the electrical unit may not be limited by the width of the wheel or the width of the rim. In embodiments of the invention, in which the electrical unit is entirely housed in the wheel, the longitudinal extent of the electrical unit is merely limited by a diagonal or radial dimension of the wheel, which, in most instances, is significantly larger than the width of the wheel.

The rotor axis may extend transversely to the hub. In one embodiment, the rotor axis is substantially orthogonal to the hub, which may especially be an advantage in order to house the electrical unit entirely within the rim.

As the rim forms a compartment, the electrical unit may be entirely contained herein, i.e. the electrical unit may not extend beyond the borders of the compartment. By avoiding elements projecting out from the wheel, the electrical unit is protected during rotation of the wheel. In order to increase safety even further, the rim may be closed at both ends, e.g. by providing a pair of hub caps.

Dependent on the mobile appliance on which the electrical driving wheel is to be mounted, the driving wheel may further comprise a tyre being mounted around the outer surface of the rim. This may e.g. be case when mounted on mobile appliances carrying items being sensitive to bumps, e.g. wheelchairs and baby carriages, or for comfort reasons, e.g. when mounted e.g. on a bike and a wheelbarrow.

The transmission system may comprise a coupling device for selectively coupling and decoupling torque transfer form the electrical unit to the rim. Thereby, idling of the wheel is facilitated, in order to reduce the level of manual power required for manual movement of an appliance incorporating the wheel. The coupling device may comprise at least one clutch achieving the coupling and decoupling. The clutch may infinitely vary the amount of driving force transmitted from the electrical unit to the circumferential rim.

The at least one clutch may be arranged to allow torque transfer to the rim only when the rim is not rotating at a higher speed than a driving speed set by the rotational speed of the output shaft. The clutch may further be arranged to release the rim from engagement with the electrical unit when the rim is rotating at a higher speed than said set driving speed. As an example, a roller bearing may be used.

As the speed of a mobile appliance on which the electrical wheel can be mounted may be too high, the wheel may further comprise a braking system activateable to decrease the speed of rotation of the rim.

The braking system may e.g. be manually activateable so that a person in control of the mobile appliance has to decide whether to activate the braking system or not. Alternatively or additionally, the braking system may comprise an automatic control which may ensure a decreased speed of rotation of the rim at a given set point for the speed.

The set point may in some embodiments be variable, so that the person in control may change the set point e.g. dependent on the structure of the ground on which the electrical wheel runs, dependent on the weather conditions, or dependent on the load being carried by the mobile appliance, etc.

As the rotational speed of the driving wheel in some embodiments may be changeable by manually changing the output of the electrical unit, the braking system may be provided so that the braking system is activateable to decrease the speed of rotation of the rim only when the rim is released from engagement with the electrical unit, i.e. during freewheeling of the wheel. The speed may be decreased by applying frictional forces directly on a part of the rim or another rotating part of the wheel.

In one embodiment, the braking system may comprise a disc brake. The disc brake may engage the rim directly or indirectly by engaging e.g. a hub cap attached to the wheel.

The braking system may be located in the compartment and it may form part of the transmission, or it may simply be attached between the hub and the rim and being capable of providing resistance against movement of the rim relatively to the hub.

When mounted on specific mobile appliances it may be an advantage if the electrical wheel can rotate in both a forward and a reverse direction. Thus, at least one of the electrical unit and the transmission system may be arranged to drive the rim in a first, forward direction and in a second, reverse direction.

Reverse rotation may, in some embodiments, be provided by changing the direction of rotation of the output shaft of the electrical unit.

The electrical unit may in preferred embodiments be an electrically driven motor. The motor may comprise a power connection element for receiving an electrical driving power from an external power source. The power source may be positioned on an appliance incorporating the driving wheel and may be connected to the motor via the power connection element and a wire. It is thus possible to avoid batteries occupying space within the driving wheel, thereby facilitating use of a larger motor.

The electrical unit may be connected to the external power source by use of wires. In order to attach the wires to the electrical unit, the hub may comprise an opening. As an example, the hub may be hollow to provide access to the inside of the wheel and thereby the electrical unit through the opening in the hub.

In some applications, it may be an advantage if the electrical wheel comprises a shock absorbing system being capable to dampen influences on the wheel during rotation of the rim, e.g. when striking a stone. The electrical wheel may therefore further comprise an elasticity element being adapted to elastically suspend the electrical unit. The elastically member may in one embodiment comprise one or more springs.

In order to facilitate turning of a mobile appliance incorporating the electrical wheel, the wheel may comprise a steering element being adapted to change the angle between the hub and a suspension structure for the wheel.

The compartment may house further components, e.g. electronic components for controlling the electrical unit, speed, braking, torque, etc. The compartment may also house a battery, a spring, or similar means for storing torque which can be released for rotation of the rim relative to the hub.

In a second aspect, the invention provides a kit of elements for assembling an electrical wheel according to the first aspect of the invention.

By providing a kit of elements for assembling an electrical wheel, one or more elements may easily be exchanged if necessary. As an example, the size of the electrical unit may vary dependent on which kit is chosen. Thereby, the wheel may be applicable in relation to different mobile appliances with very little work associated herewith.

It should be understood, that the above-mentioned features of the first aspect of the invention may be applicable in relation to the kit according to the second aspect of the invention. Thus, the second aspect may comprise any combination of features and elements of the first aspect of the invention.

The hub and the rim of the kit may be connected by use of an element which can be operated by hands. This may be achieved by providing the rim and the hub, such that the rim can be slided onto the hub. The rim and the hub may be connected to each other by hand by the use of e.g. a click-coupling element. By click-coupling is in this connection understood a coupling by which a part of the hub is shaped to engage a part of the rim to define a seal between the rim and the hub to ensure proper engagement there between so that the rim does not slide of the hub during rotation of the wheel. It should however be understood, that the rim can rotate about the hub. As an example, the hub may comprise a protrusion along its outer periphery, so that the diameter of the hub is at least slightly larger at this position than the diameter at other positions along the hub. When sliding the rim along the length of the hub and passing the protrusion, the protrusion will ensure that the rim cannot slide backwards again without use of forces applied along the length of the hub.

To facilitate assembling of the elements of the kit, the rim may comprise a bearing formed integral with the rim and capable of receiving the hub for suspension of the rim about the hub. In a simple embodiment, the bearing may be an opening sized to receive the hub.

The transmission may comprise a first and a second drive wheel and a belt, the first drive wheel being driven by the electrical unit and the second drive wheel being driven by the first drive wheel via the belt. Furthermore, the rim may comprise a seat onto which the second drive wheel can be slided whereby the second drive wheel and the rim become locked against rotation relative to each other. Torque may thereby be transferred from the electrical unit to the rim.

To facilitate assembling of the transmission and rim, the second drive wheel may be provided such that it can slide onto the seat by movement of the second drive wheel along the centre line relative to the seat.

In a third aspect, the invention provides a mobile appliance comprising an electrical wheel according to the first or second aspect of the invention.

Thus, it should be understood, that the above-mentioned features of the first aspect and the second aspect of the invention may be applicable in relation to the mobile appliance according to the third aspect of the invention. Thus, the third aspect may comprise any combination of features and elements of the first aspect and/or second aspect of the invention.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
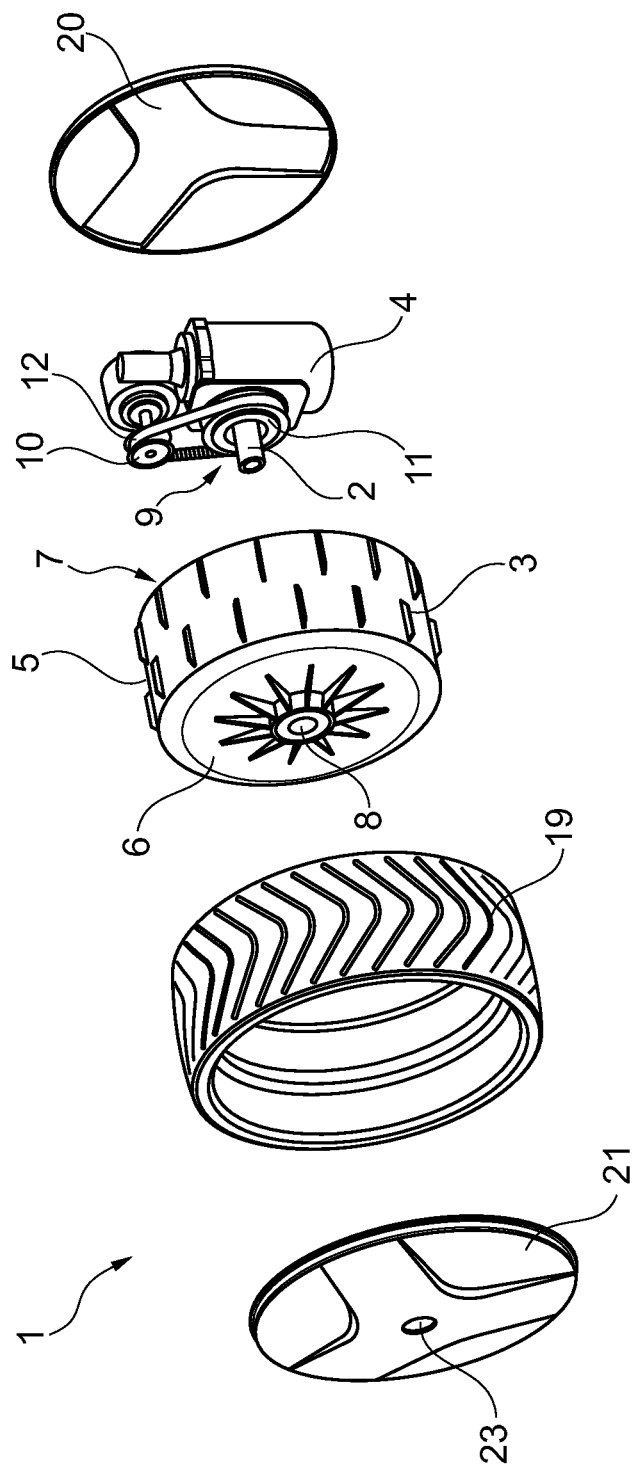
FIG. 1 illustrates elements of one embodiment of the electrical wheel.
Figure 2:
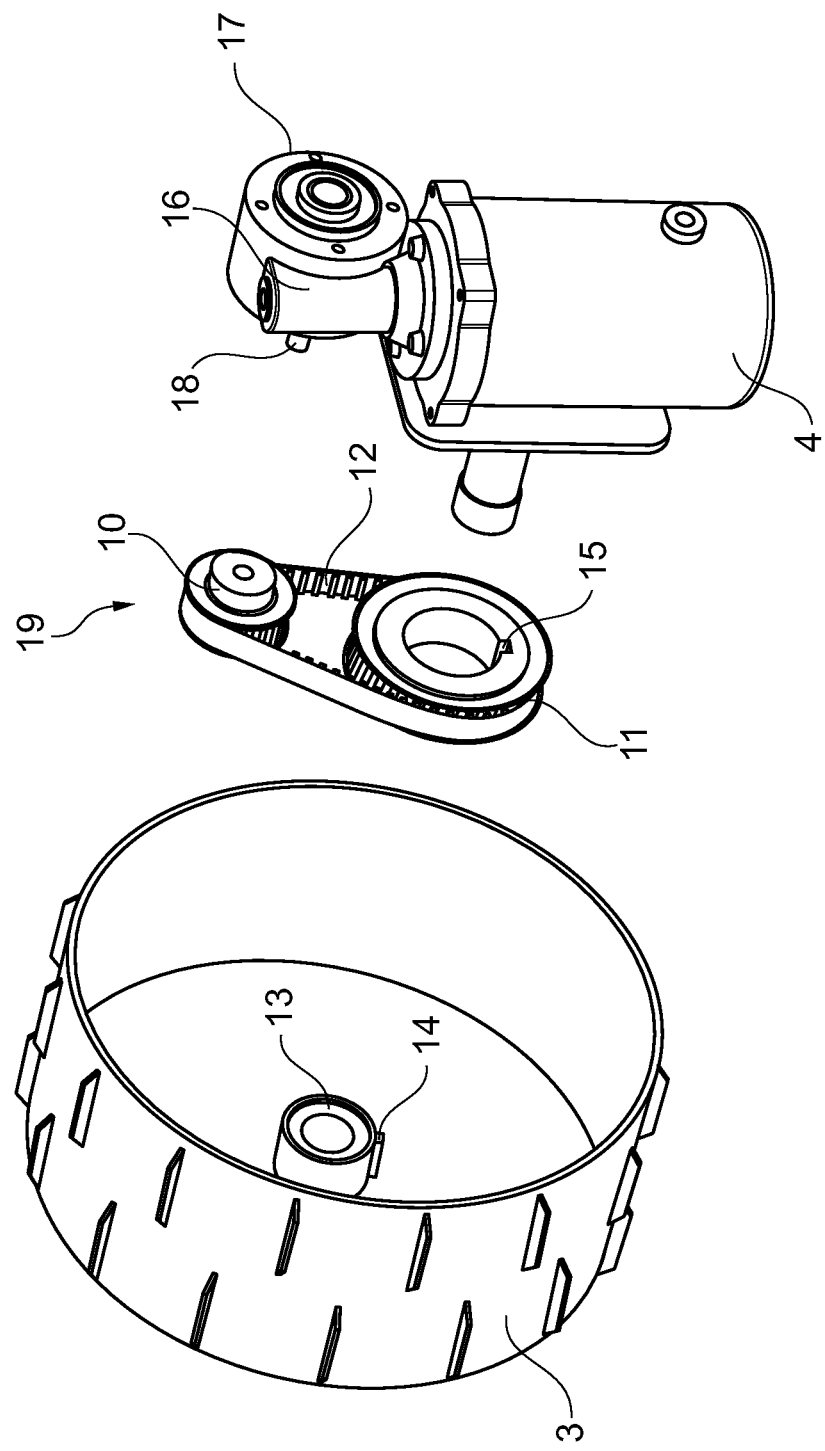
FIG. 2 illustrates a rim, a transmission and an electrical unit for an embodiment of the electrical wheel.

FIGS. 1 and 2 illustrate elements of an embodiment of an electrical wheel 1. The wheel 1 comprises a hub 2 located along a centre line (not shown), a rim 3 being rotatable about the hub 2 such that the centre line forms axis of revolution, and an electrical unit in the form of a motor 4 arranged to provide torque between the hub 2 and the rim 3.

The rim 3 forms a compartment with a sidewall 5 extending between a circular bottom 6 and an opening 7. In the illustrated embodiment, the circular bottom is a closed surface with an opening 8 forming a suspension 8 through which the hub 2 extends. The suspension 8 is located centrally in the circular bottom 6. The hub 2 terminates in a free end (not shown) inside the compartment.

The motor 4 is located in the compartment in continuation of the hub 2 and fixed to the free end of the hub 2.

During rotation of the wheel 1, the hub 2 does not rotate. The rim 3 can rotate about the centre line and radial about the hub 2, thereby allowing for rotation of the wheel 1. As the motor 4 is fixed to the hub 2, the motor 4 does not rotate with the wheel 1. Instead the motor 4 is kept at a fixed position relative to the hub 2 during rotation of the wheel 1.

Furthermore, the wheel 1 comprises a transmission 9 for transferring the torque from the motor 4 to the rim 3. The transmission 9 is arranged in the compartment about the hub 2, and the transmission 9 is located between the bottom 6 and the motor 4.

The transmission 9 comprises a first drive wheel 10, a second drive wheel 11, and a belt 12. The first drive wheel 10 is driven by the motor 4 and the second drive wheel 11 is driven by the first drive wheel 10 via the belt 12. To facilitate driving of the first and second drive wheels 10, 11, the drive wheels 10, 11 are provided with a toothed outer surface whereas the belt 12 is provided with a toothed inner surface (see FIG. 2).

To ensure that the motor 4 can provide torque between the hub 2 and the rim 3, the rim 3 comprises a seat 13 for carrying the second drive wheel 11. In the illustrated embodiment, the seat 13 is formed integrally with the rim 3.

The seat 13 is positioned centrally relative to the suspension 8 so that the centre of both the seat 13 and the suspension 8 is located at the centre line (not shown). The hub 2 thereby extends through both the seat 13 and the suspension 8. This is achieved by positioning the seat 13 around the suspension 8 by providing the seat 13 with a central opening with a diameter being substantially equal to the outer diameter of the suspension 8.

Torque can thus be transferred from the hub 2 to the rim 3 by ensuring engagement between the second drive wheel 11 and the seat 13 so that rotation of the second drive wheel 11 results in rotation of the seat 13. As the seat 13 forms part of the rim 3, rotation of the second drive wheel 11 thus ensures rotation of the rim 3.

Engagement between the seat 13 and the second drive wheel 11 is in the illustrated embodiment ensured by providing a protrusion 14 on the outer perimeter of the seat 13 which protrusion 14 engages an indentation 15 in the inner perimeter of the second drive wheel 11.

The motor 4 comprises an output shaft 16 rotatably around a rotor axis, the rotor axis being non-parallel with the hub 2, and thereby the centre line. Due to the fact that the rotor axis and hence the motor 4 itself extend non-parallel to the hub 2, the longitudinal extent of the motor 4 is not limited by the width of the wheel 1 or the width of the rim 3. To facilitate driving of the first drive wheel 10, the output shaft 16 and the first drive wheel 10 are connected via gears (not shown) enclosed in a gear house 17 and a gear output shaft 18.

In the illustrated embodiment, a tyre 19 is mounted around the outer surface of the rim 3. Furthermore, a set of hub caps 20, 21 is used to close the wheel 1. The front hub cap 20 is closed, whereas the back hub cab 21 is provided with a centrally positioned opening to allow the hub 2 to extend here through.

Figure 3:
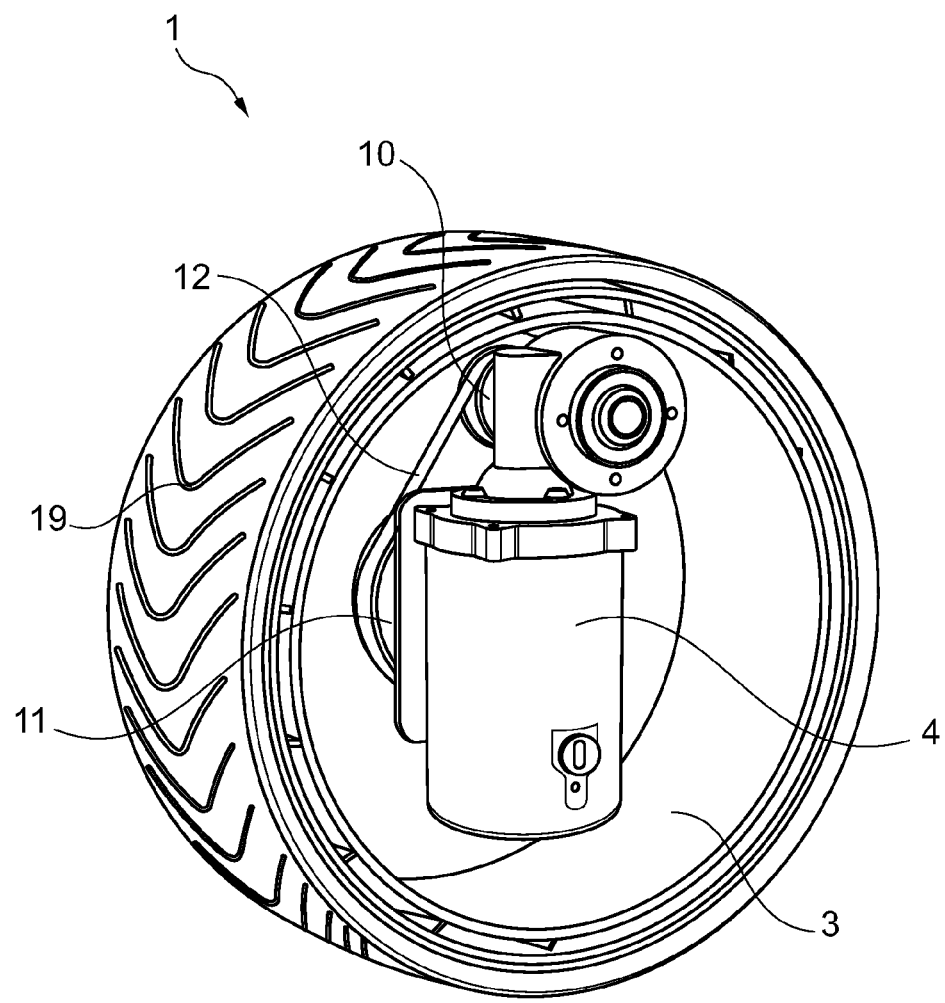
FIG. 3 illustrates an embodiment of the electrical wheel.

FIG. 3 illustrates an embodiment of an electrical wheel 1 in which most of the elements of FIGS. 1 and 2 are assembled. The front hub cap 20 is removed to show the inner of the compartment.

Figure 4:
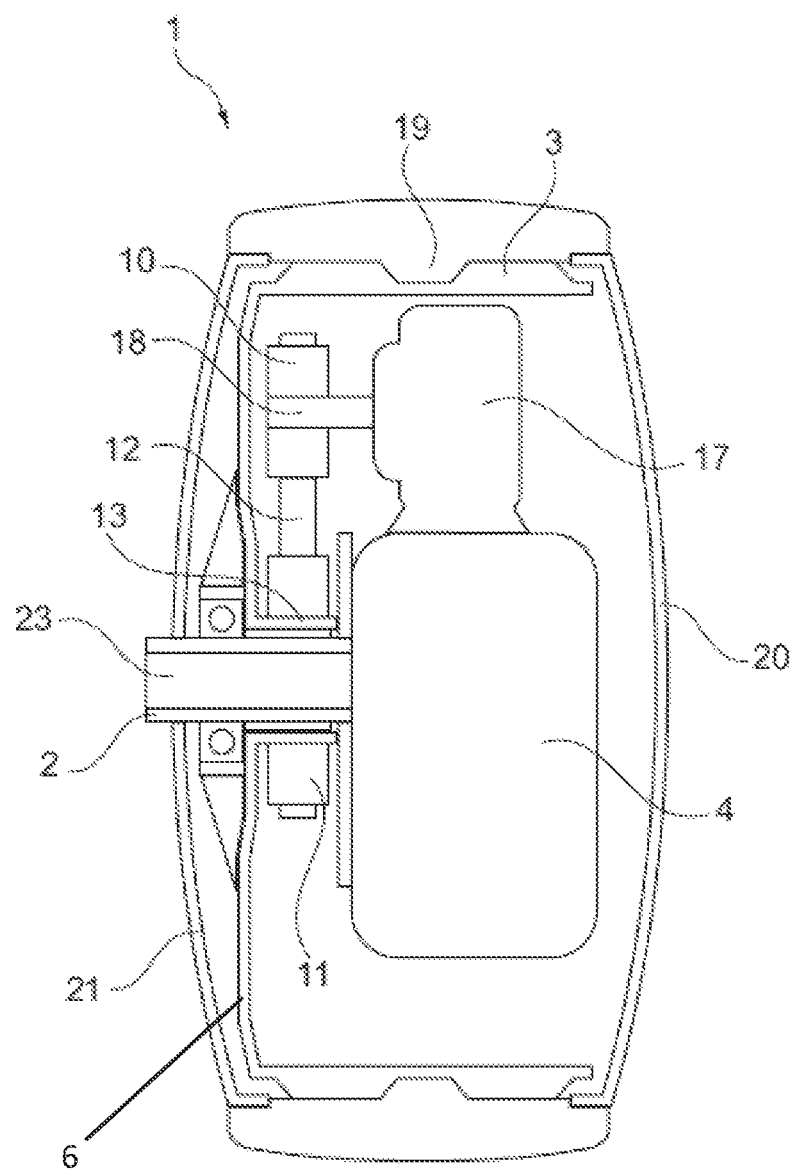
FIG. 4 illustrates a section through an embodiment of the electrical wheel.

FIG. 4 illustrates a section through an embodiment of an electrical wheel 1, as described above.

Figure 5:
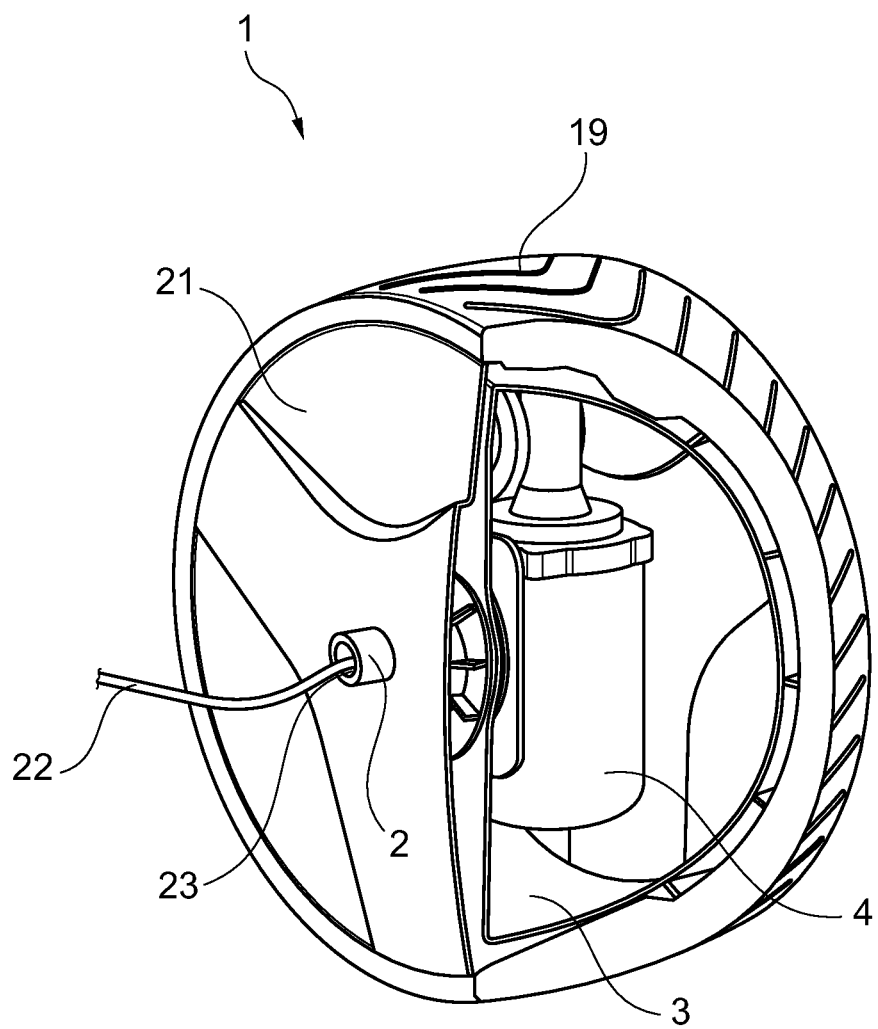
FIG. 5 illustrates an example of power supply to an embodiment of the electrical wheel.

FIG. 5 illustrates an example of power supply to an embodiment of an electrical wheel 1. In the illustrated embodiment, the electrical unit 4 is an electrically driven motor. The motor 4 comprises a power connection element (not shown) for receiving an electrical driving power from an external power source (not shown). The power source can be positioned on an appliance incorporating the driving wheel 1. It is thus possible to avoid batteries occupying space within the driving wheel 1, thereby facilitating use of a larger motor 4.

The motor 4 is connected to the external power source (not shown) by use of wires 22. In order to attach the wires 22 to the motor 4, the hub 2 comprises a hub opening 23. In the present embodiment, the hub 2 is hollow to provide access to the inside of the wheel 1 and thereby to the motor 4 through the hub opening 23 in the hub 2.

Figure 6A:
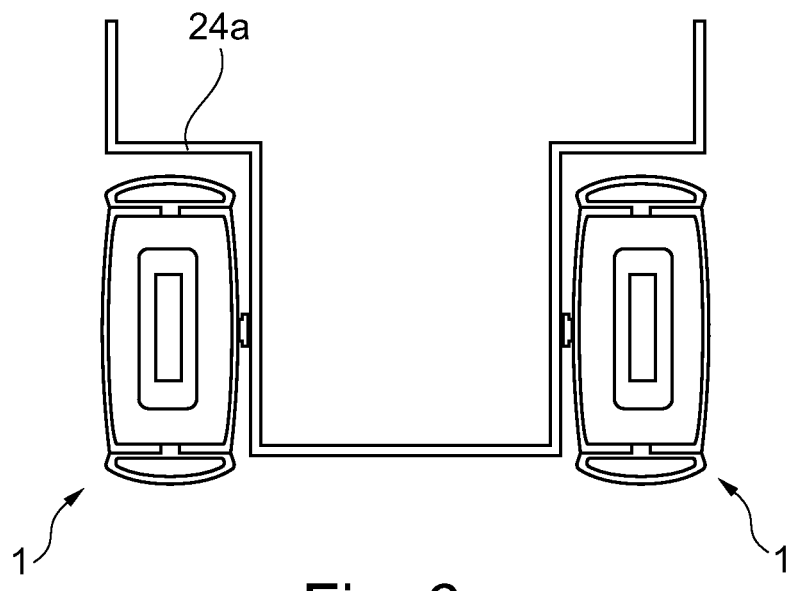
FIGS. 6*a* and 6*b* illustrate an embodiment of the electrical wheel applied to two different mobile appliances.
Figure 6B:
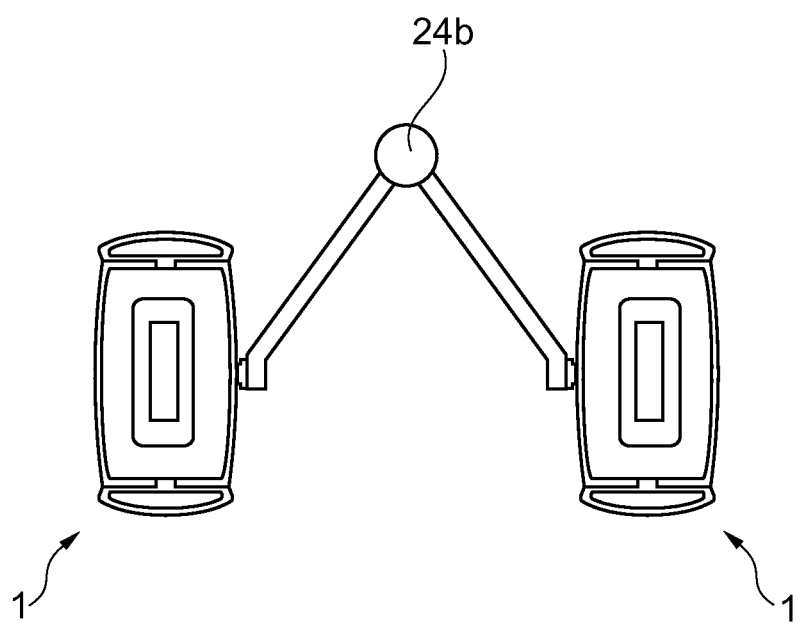

As schematically illustrated in FIGS. 6a and 6b the electrical wheel 1 can be applied to mobile appliances 24a, 24b in different ways. As the hub 2 does not rotate with the wheel, a mobile appliance 24 can be attached directly to the hub 2.

Figure 7:
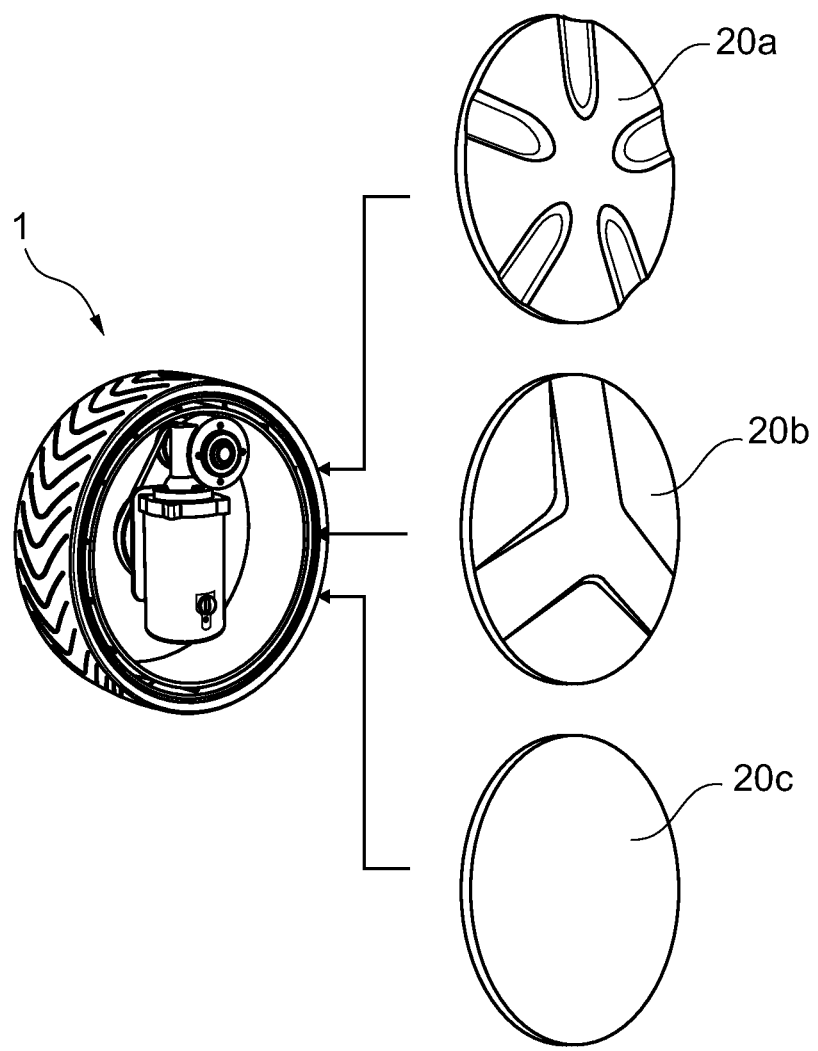
FIG. 7 illustrates different hub caps for embodiments of the electrical wheel.

FIG. 7 illustrates different hub caps 20 for an electrical wheel 1. The visual design may vary dependent on the use of the wheel 1, e.g. dependent on which mobile appliance the wheel 1 should be attach to. Furthermore, the front hub cap 20 may be used for commercial purposes as a logo, a name, a drawing, or other commercial indicators may be attached to or printed on the front hub cap 20.

The invention claimed is:

1. An electrical wheel comprising a hub extending along a center line, a rim being rotatable about the hub such that the center line forms axis of revolution, and an electrical unit arranged to provide a torque between the hub and the rim, where
the rim forms a compartment with a sidewall extending between a circular bottom and an opening;
the hub extends through a suspension located centrally in an opening in the circular bottom forming a closed surface and terminates in a free end inside the compartment;
the electrical unit is located in the compartment in continuation of the hub and fixed to the free end of the hub; and
where the wheel comprises a transmission for transferring the torque from the electrical unit to the rim, the transmission is positioned on the hub, the hub is disposed perpendicular to the circular bottom, and the transmission is located between the bottom and the electrical unit.

2. The wheel according to claim 1, wherein the electrical unit is configured as a motor which can move the rim relative to the hub.

3. The wheel according to claim 1, wherein the electrical unit is configured as a generator which can generate electric energy upon movement of the rim relative to the hub.

4. The wheel according to claim 1, wherein the transmission comprises a first and a second drive wheel and a belt, the first drive wheel being driven by the electrical unit and the second drive wheel being driven by the first drive wheel via the belt.

5. The wheel according to claim 4, wherein the rim comprises a seat for carrying the second drive wheel.

6. The wheel according to claim 1, wherein the electrical unit comprises an output shaft rotatably around a rotor axis, the rotor axis being non-parallel with the hub.

7. The wheel according to claim 1, wherein the electrical unit comprises a power connection element for receiving an electrical driving power from an external power source.

8. The wheel according to claim 7, wherein the electrical unit is connected to the external power source by wires through the hub.

9. A kit of elements for assembling an electrical wheel according to claim 8.

10. The kit according to claim 9, wherein the hub and the rim are releasably connected by use of an element which can be operated by hands.

11. The kit according to claim 8, wherein the rim comprises a bearing formed integral with the rim and capable of receiving the hub for suspension of the rim about the hub.

12. The kit according to claim 8, wherein the transmission comprises a first and a second drive wheel and a belt, the first drive wheel being driven by the electrical unit and the second drive wheel being driven by the first drive wheel via the belt, and wherein the rim comprises a seat onto which the second drive wheel can be slided whereby the second drive wheel and the rim become locked against rotation relative to each other.

13. The kit according to claim 12, wherein the second drive wheel can slide onto the seat by movement of the second drive wheel along the centre line relative to the seat.

14. A mobile appliance comprising an electrical wheel according to claim 1.

\* \* \* \* \*